United States Patent Office 3,516,679
Patented June 23, 1970

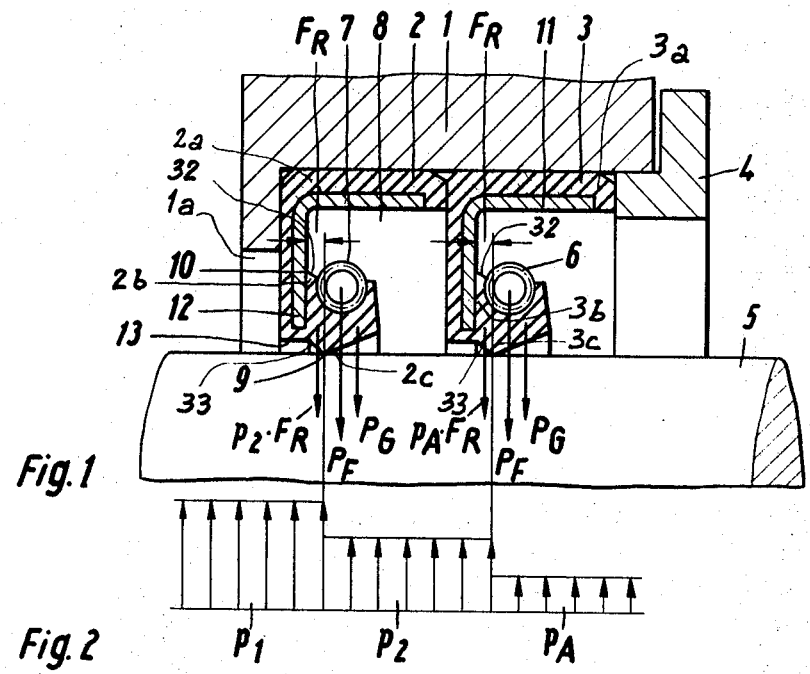
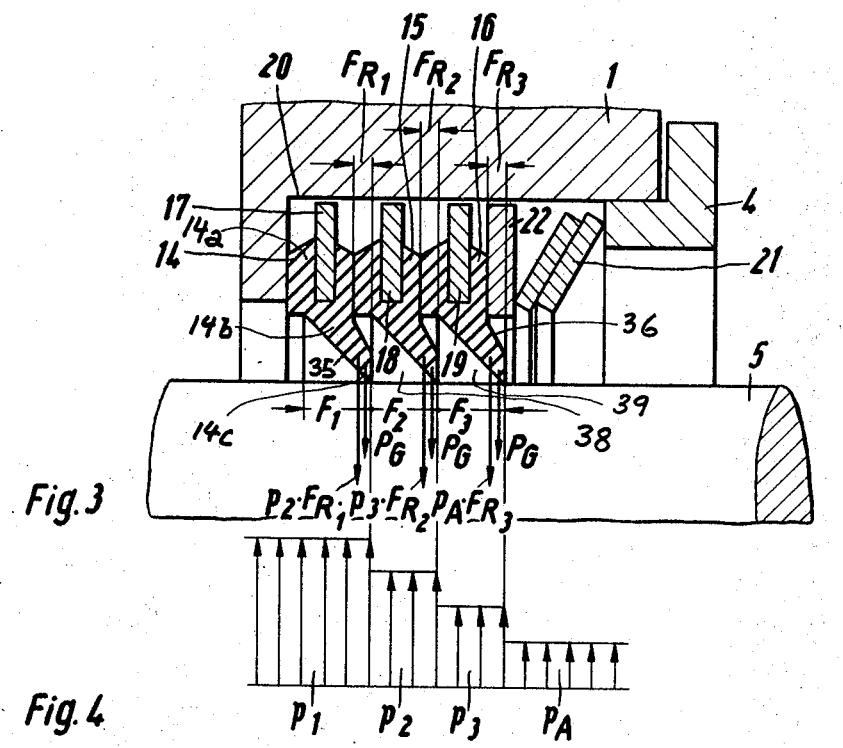

3,516,679
SEALING ARRANGEMENT
Wilhelm Schmitt, Vordersberg, Germany, assignor to
Carl Freuden, Weinheim, Germany
Filed Aug. 22, 1967, Ser. No. 662,511
Int. Cl. F16j *15/32*
U.S. Cl. 277—51                                    12 Claims

ABSTRACT OF THE DISCLOSURE

The lip portions of a plurality of annular sealing means surround a shaft and form at least one chamber. The lip portions exert a resilient sealing force on the shaft and have two pressure surfaces subjected to the chamber pressure and to outer pressure, respectively, so that the pressure is gradually reduced. The high outer pressure urges the lip portion away from the shaft, while the chamber pressure and the resilient sealing force urge the lip portion against the shaft, overcoming the effect of the outer pressure after a balanced sealing condition is established.

BACKGROUND OF THE INVENTION

The present invention relates to a sealing arrangement for reciprocating and rotating machine parts which have to be sealed against liquid or gaseous fluid having high pressure. More particularly, the invention relates to the sealing of the gap between a shaft and a portion of a housing containing a high pressure liquid.

In accordance with the prior art complicated and expensive slide ring sealings with non-elastic axial slide surfaces are used. A radial sealing means consisting of elastic materials is known in which a lip portion abuts a stationary reinforcing ring which partly sustains the pressure acting on the lip portion. The known radial sealing means for high pressure have the disadvantage that the force by which the lip portion is pressed against the shaft or other moving machine part, increases when the pressure of the pressure medium is increased, so that the friction losses and the temperature at the sealing edge is correspondingly increased. The span of life of sealing means of this type is short, and the high friction and temperatures result in great wear and damage to the contacting parts sliding on each other. It is also difficult to dissipate the heat developed by friction.

It is one object of the invention to overcome the disadvantages of known sealing arrangements for moving machine parts, and to provide a sealing arrangement in which the sealing portions or edges are pressed by a comparatively low force against the moving machine part so that friction and wear are low, while nevertheless reliable sealing against high pressure is obtained.

Another object of the invention is to press the sealing portions into sliding engagement with a movable machine part by a force which is partly a resilient force produced by the sealing means, and partly a pressure force derived from the pressure fluid.

The sealing arrangement according to the invention is particularly advantageously used for sealing reciprocating and rotating machine parts against a liquid or gaseous medium under a comparatively high pressure.

SUMMARY OF THE INVENTION

With the above objects in view, sealing means having lip portions are arranged in the axial direction of the shaft in adjacent position so that they bound at least one chamber or several successive chambers filled with the pressure medium. Each sealing means has on the high pressure side of the gap a surface on which the pressure acts to relieve the lip portion, and on the other side a second pressure surface subjected to the pressure in the respective chamber and producing a force pressing the lip portion into contact with the shaft in addition to the resilient force produced by the elastic material of the sealing means, and if desired by an additional metal spring. Due to this arrangement, the pressure in the chambers is gradually reduced so that the last chamber can be reliably sealed by the resilient force alone.

As a result, each lip portion abuts the movable machine parts with a comparatively small force.

One embodiment of the invention comprises at least first and second sealing means, which may be the first and last sealing means of a row of adjacent sealing means. The sealing means have abutment portions abutting each other and one machine part, lips abutting another machine part with a predetermined resilient sealing force, and flexible intermediate connecting portions having first and second pressure surfaces on opposite sides.

The first pressure surface of the first sealing means is located on the high pressure side, and the second pressure surface thereof partly bounds the chamber between the sealing means so that pressure fluid overcoming the resilient sealing force enters the chamber until a reduced pressure in the chamber acting on the second pressure surface of the first sealing means, together with the resilient sealing force, balances the high pressure acting on the first pressure surface.

The first pressure surface of the second sealing means partly bounds the chamber and is subjected to the reduced pressure in the same which is insufficient to overcome the resilient sealing force exerted by the lip of the second sealing means.

In one specific embodiment of the invention, the abutment portions are annular and adhere corresponding annular surfaces of a stationary housing part, while being pressed against each other by a movable cover of the housing.

In another embodiment of the invention, the abutment portions have lateral faces pressed against each other and spaced from the inner surface of the cavity of the housing part in which they are located. This arrangement effects self-centering of the annular sealing means, particularly if spring means, such as dished springs, are pressed in axial direction against a stack of annular sealing means.

In a further modification of the invention, the abutment portions form an integral body from which the connecting portions and lips project. The lips are again held in sealing contact by the combined force of the resilient material and of the pressure in the respective chamber, counteracting the higher pressure on the high pressure side of the respective sealing means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a fragmentary axial sectional view illustrating one embodiment of the invention;

FIG. 2 is a schematic diagram illustrating the pressure distribution in the embodiment of FIG. 1;

FIG. 3 is a fragmentary axial sectional view illustrating another embodiment of the invention; and FIG. 4 is a schematic diagram illustrating the pressure distribution in the embodiment of FIG. 3.

DESCRIPTION OF THE PREFERRED EMBODIMENTS

In both embodiments of the invention, a main housing portion 1 forms a cavity in which a plurality of sealing means form a stack which is pressed together in axial direction by a holding ring 4. A shaft 5 passes through the cavity in the housing and forms with the same a gap which is sealed by the sealing arrangement of the invention. It is assumed that a liquid or gaseous medium having the high pressure $p_1$ is present at the left side of the housing portion, and that lower pressure, for example atmospheric pressure $p_A$ prevails on the right side of the housing.

Referring now to FIG. 1, first and second annular sealing means 2 and 3 are pressed into the cylindrical cavity of the housing portion 1 by holding ring 4 which may be connected to housing portion 1 by screws, not shown. Holding ring 4 acts on abutment portions 2a, 3a which are connected by annular connecting portions 2b, 3b to annular lips or lip portions 2c, 3c which have annular sealing edges 9 in sliding sealing contact with the rotating or reciprocating shaft 5.

Sealing means 2 and 3 consist of a resilient elastic material, and the diameter of the sealing edge 9 is slightly smaller than the diameter of shaft 5 so that lips 2c, 3c are resiliently expanded during assembly, and abut shaft 5 with a resilient force acting in radial direction, and having a component $P_G$ produced by the resiliently deformed elastic material of the lip portion and connecting portion, and another radial component $P_F$ produced by coil springs 6 and 7 which surround the lip portions 3c and 2c.

Housing portion 1 is part of a wall of a housing filled with the high pressure medium tending to flow through the gap 1a between housing portion 1 and shaft 5 to the low pressure area on the right side of housing part 1 and sealing means 3.

Connecting portions 2b and 3b have outer annular slanted pressure surfaces 32, and inner annular slanted pressure surfaces 33 located between radial planes passing through the sealing edge 9 and through the edge 10, and have an effective pressure area $F_R$.

The high pressure $p_1$ acts outward on the pressure surface 33 of sealing means 2, while the outer pressure surface 32 is subjected to the inwardly acting pressure prevailing in the chamber 8 formed between sealing means 2 and 3.

At first, the pressures are unbalanced, and the pressure $p_1$ produces a force counteracting the elastic sealing force $P_G$, and the force $P_F$ produced by spring 7, and overcoming the same, so that the lip 2c is lifted off shaft 5, and fluid under pressure enters chamber 8. The pressure developing in chamber 8 acts on pressure surface 32 of sealing means 2 and urges lip 2c into sealing engagement with shaft 5.

The force exerted by the pressure $p_2$ in chamber 8 on the area $F_R$ of pressure surface 32, together with the forces $P_F$ and $P_G$ is at least equal to the force exerted by the high pressure $p_1$ on the area $F_R$ of pressure surface 33 so that the pressure $p_2$ in chamber 8 is lower than the pressure $p_1$.

The abutment portion 2a is made rigid by the reinforcing member 12, so that the force exerted by the pressure $p_1$ on the annular surface 13 has no effect.

The forces exerted by the pressure $p_2$ in chamber 8 on the upper and lower surfaces of the lip portion 2c on the right side of edge 9, compensate each other and do not flex lip portion 2c about connecting portion 2b.

In the embodiment of FIG. 1, in which only two annular sealing means are provided, the resilient sealing force $P_G$ produced by the deformed resilient material of the lip portion 3c and connecting portion 3b and the resilient force $P_F$ produced by spring 6, together with atmospheric pressure $p_A$, must be capable of holding lip portion 3c in sealing engagement with shaft 5 against the force exerted by the reduced pressure $p_2$ on pressure surface 33 of connecting portion 3b so that no pressure fluid can escape into the region of atmospheric pressure on the right side of sealing means 3. Therefore, the pressure $p_2$ in chamber 8 must be sufficiently reduced which is achieved by accordingly dimensioning the spring 7 and the resilient portions 2c and 2b.

The sealing arrangement of FIG. 1 is self-regulating inasmuch as the sealing force urging the lip portion 2c against shaft 5 automatically assumes the minimum value at which chamber 8 is sealed by sealing edge 9. If additional sealing means, constructed in the same way as sealing means 2 and 3, are inserted between the same, several chambers are formed in each of which the pressure is reduced, while the lip portion of each sealing means is pressed with a minimum necessary pressure into sealing engagement with shaft 5. Only the last sealing means 3 is an exception, inasmuch as the resilient sealing force must be greater than the pressure force acting on pressure surface 33 and tending to open the lip portion 3c.

In the embodiment illustrated in FIG. 3, three sealing means 14, 15 and 16 are located in the cavity of housing portion 1 which has an inner cylindrical surface 20. Sealing means 14 has an abutment portion 14a, a connecting portion 14b, and a lip 14c abutting shaft 5 in sealing engagement. Connecting portion 14b has pressure surfaces 35 and 36 located on opposite sides thereof, the effective pressure area of pressure surface 36 being $F_{r1}$, and the effective pressure area of pressure surface 35 being $F_1$. The pressure surfaces of sealing means 15 and 16 have corresponding annular pressure surfaces 35, 36 with effective pressure areas $F_2$, $F_3$ and $F_{r2}$, $F_{r3}$. Metal rings 17, 18, 19 are inserted into the abutment portions of sealing means 14, 15 and 16 and have outer diameters spaced from the inner surface 20 of the cavity in housing portion 1. The lateral faces of the abutment portions abut each other under the pressure of the ring 22, which is pressed by a pair of dished springs 21 against the lateral face of the abutment portion of sealing means 16 by the action of a holding ring 4 secured by screws to housing part 1.

The high pressure on the left side of the sealing arrangement acts on the area $F_1$ of the pressure surface 35 and lifts the lip 14c off shaft 5 so that a pressure $p_2$ develops in the chamber 38 between sealing means 14 and 15 and acts on the area $F_{r1}$ of pressure surface 36. The resulting pressure force, $p_2$ multiplied by $F_{r1}$, together with the resilient sealing force $P_g$ produced by the deformation of the sealing means, hold lip 14c in sealing engagement with shaft 5. Due to the additional force $P_g$, the pressure in chamber 38 is reduced as compared with the pressure on the left side of sealing means 14, and a corresponding pressure drop is produced by the lip of sealing means 15 so that the pressure $p_3$ in the next chamber 39 is further reduced, and insufficient to lift the lip of sealing means 16 which is held in sealing engagement by the resilient force $P_g$, and by the atmospheric pressure $P_A$ multiplied by the area $F_{r3}$.

In the embodiment of FIG. 1, the atmospheric pressure acting on pressure surface 32 of sealing means 3, also produces a force, $P_A$ multiplied by the area $F_r$ to hold the sealing lip 3c in engagement with shaft 5.

FIGS. 2 and 4 illustrate the stepwise pressure drop between the high pressure $p_1$ and the low pressure $P_A$.

It will be understood that each of the elements described above, or two or more together, may also find a useful application in other types of sealing arrangements differing from the types described above.

While the invention has been illustrated and described as embodied in a sealing arrangement for sealing a gap between a shaft and a housing by a plurality of annular sealing means having annular lips resiliently abutting the shaft, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of the prior art, fairly constitute essential characteristics of the generic or specific aspects of this invention and, therefore, such adaptations should and are intended to be comprehended within the meaning and range of equivalence of the following claims.

What is claimed is:

1. Sealing arrangement for two parts forming a gap on opposite sides of which high and low pressure fluids are present, comprising, in combination, at least first and second sealing means disposed in said gap on the high and low pressure sides, respectively, said first and second sealing means having abutment portions mounted on one of said parts, lips abutting the other part, and flexible resilient connecting portions intermediate said abutment portions and said lips, respectively, and being resiliently deformed so that said lips are resiliently pressed against said other part with a predetermined resilient sealing force, said first and second sealing means bounding a chamber, each connecting portion of said first and second sealing means having first and second pressure surfaces on opposite sides, said first pressure surface of aid first sealing means being located on said high pressure side subjected to said high pressure and positioned so that said high pressure urges said lip of said first sealing means away from said other part whereby pressure fluid overcoming said resilient sealing force enters said chamber and produces a chamber pressure, said second pressure surface of said first sealing means partly bounding said chamber and being positioned so that said chamber pressure acting on said second pressure surface urges, together with said sealing force, said lip of said first sealing means into abutment with said other part, and balances the high pressure acting on said first pressure surface of said first sealing means, said first pressure surface of said second sealing means partly bounding said chamber and being subjected to said chamber pressure which is insufficient to overcome the resilient sealing force exerted by said lip of said second sealing means on said other part.

2. Sealing arrangement as claimed in claim 1 wherein said second pressure surface of said second sealing means is located on said low pressure side subjected to said low pressure and is positioned so that said low pressure, together with the resilient sealing force of said second sealing means, urges said lip of said second sealing means into sealing abutment with said other part.

3. Sealing arrangement as claimed in claim 1 wherein said first and second pressure faces are slanted so that force components of said high pressure and said chamber pressure bias said lip of said first sealing means.

4. Sealing arrangement as claimed in claim 1 comprising at least one sealing means intermediate said first and second sealing means having an abutment portion between said abutment portions of said first and second sealing means, a lip abutting said other part with a resilient sealing force, and a connecting portion having first and second pressure surfaces on opposite sides whereby said intermediate sealing means forms first and second chambers with said first and second sealing means so that the high pressure is gradually reduced in said first and second chambers.

5. Sealing arrangement as claimed in claim 1 and comprising spring means abutting said lip and producing at least part of said resilient sealing force.

6. Sealing arrangement as claimed in claim 1 comprising rigid reinforcing members secured to said abutment portions.

7. Sealing arrangement as claimed in claim 1 wherein said one part is a housing, wherein said other part is a shaft, wherein said gap is annular and surrounds said shaft, wherein said sealing means, abutment portions, lips, connecting portions, chambers, and first and second pressure surfaces are annular; wherein said abutment portions are mounted on said housing and said lips abut said shaft.

8. Sealing arrangement as claimed in claim 7 wherein said housing has a cavity, wherein said first and second sealing means are located in said cavity, and wherein said abutment portions abut the surface of said cavity and each other.

9. Sealing arrangement as claimed in claim 7 wherein said housing has a cavity having an annular inner surface with a predetermined diameter, said first and second annular sealing means being located in said cavity, said annular abutment portions having an outer diameter smaller than said inner diameter and being radially spaced from said annular inner surface, said annular abutment portion abutting each other in axial direction and forming a stack; and comprising spring means abutting one end of said stack and also said housing and urging said stack to a position in which the other end thereof abuts said housing.

10. Sealing arrangement as claimed in claim 7, comprising at least one annular sealing means intermediate said first and second sealing means having an abutment portion between said abutment portions of said first and second sealing means, a lip abutting said shaft with a resilient sealing force, and a connecting portion having first and second pressure surfaces on opposite sides whereby said intermediate sealing means forms first and second chambers with said first and second sealing means so that the high pressure is gradually reduced in said first and second chambers.

11. Sealing arrangement as claimed in claim 7 wherein said housing includes a main portion and a holding ring, said abutment portions being located between said main portion and said holding ring; and comprising means for pressing said holding ring against said abutment portion of one of said sealing means so that said abutment portions of said first and second sealing means abut each other and said main portion of said housing.

12. Sealing arrangement as claimed in claim 1 wherein said abutment portions form an integral body having said connecting portions and lips projecting therefrom.

References Cited

UNITED STATES PATENTS

| | | | |
|---|---|---|---|
| 2,073,768 | 3/1937 | Victor et al. | 277—51 X |
| 2,088,703 | 8/1937 | Hubbard et al. | 277—49 |
| 2,350,697 | 6/1944 | Petch | 277—49 |
| 2,485,940 | 10/1949 | Tremolada | 277—51 |
| 3,348,849 | 10/1967 | Newcomb et al. | 277—58 X |
| 3,351,350 | 11/1967 | Shepler | 277—58 |
| 3,362,719 | 1/1968 | McCormick | 277—153 X |

FOREIGN PATENTS 181,954  3/1907  Germany.

JAMES KEE CHI, Primary Examiner

U.S. Cl. X.R.

277—58, 123, 153